Patented Jan. 28, 1947

2,414,974

UNITED STATES PATENT OFFICE 2,414,974

PRODUCTION OF FERRIC ORTHOPHOSPHATE

Morris L. Nielsen, Anniston, Ala., assignor to Monsanto Chemical Company, a corporation of Delaware No Drawing. Application August 30, 1943, Serial No. 500,571

16 Claims. (Cl. 23—105)

This invention relates to a process for producing ferric orthophosphate in an assimilable form suitable for incorporation with cereals and other food products which are deficient in iron and phosphorus.

An object of this invention is to provide a process for preparing substantially white ferric orthophosphate having a low alkali metal oxide content in a finely divided form which may be used in the preparation of enriched wheat flour and bread.

Another object is to provide a process for producing ferric orthophosphate having a high $Fe_2O_3/P_2O_5$ ratio, that is a ratio of substantially 1.

A further object is to provide a reproducible process of preparing substantially white ferric orthophosphate wherein the yield of iron salt is substantially 95% of the theoretical value.

A further object is to provide substantially white ferric orthophosphate as a material for fortifying food products, flour and other cereal products.

Other objects of the invention will be apparent to those skilled in the art upon reading the specification.

It has long been recognized that the iron content of whole cereal grains, especially wheat, is a property of considerable nutritional value. Medical authorities have advocated consumption of whole wheat cereal products as a means of increasing the amount of iron supplied by the average human diet. However in the milling of these cereal products, particularly whole wheat products, to form flours, much of the iron distributed throughout the tissue adjacent to and constituting the bran layer is lost so that the products which are obtained are relatively low in this nutritional element. This has resulted in the introduction of the "enriched" flours and breads on the market and now the addition of an assimilable iron compound which is substantially white in color has been made a prerequisite for these products.

Earlier known methods for preparing ferric orthophosphate have involved a double decomposition reaction of soluble ferric salts and alkali phosphates. Generally these processes yield products which are colored. Where ferric phosphates are to be incorporated with food, flour and other cereal products, it is desirable that these phosphates be white or only slightly colored and consequently the ferric phosphates of the prior art are not suitable for this purpose.

I have now discovered that when soluble ferric salts of inorganic acids, particularly ferric chloride, sulfate, nitrate, etc. are added to an aqueous solution containing a dibasic alkali metal phosphate and an alkali metal salt such as sodium and potassium carbonate an amorphous precipitate is formed. The amorphous precipitate is substantially pure ferric orthophosphate and is recoverable in substantially quantitative yields. As produced by my process, this product possesses a high nutritional availability. For carrying out my process I propose to employ relatively dilute solutions of both the ferric salt and the dibasic alkali metal phosphate. The concentration of the ferric salt is maintained at not over 17.8% iron content by weight. The best results, however, are obtained with a concentration of 10% iron, but substantially white products have also been obtained at much lower concentrations. The concentration of the dibasic alkali metal phosphate should not be over 10% by weight of $P_2O_5$ and, for most satisfactory results, may be maintained below this figure, and preferably within the range of 3 to 5% $P_2O_5$. The phosphate solution should contain both a dibasic alkali metal phosphate and a sufficient amount of an alkali metal salt such as sodium or potassium carbonate to yield in the solution a composition having an alkali metal oxide/$P_2O_5$ ratio in the neighborhood of 3 moles of alkali metal oxide per mole of $P_2O_5$. Such a ratio corresponds approximately to the ratio of these radicals in trisodium phosphate. Trisodium phosphate, however, cannot be satisfactorily employed because of the highly colored products obtained.

In place of the alkali metal carbonates, the corresponding bicarbonates may be used. In fact any alkali metal salt of a weak acid, that is, an acid weaker than phosphoric acid, may be employed.

The production of ferric orthophosphate by my process is carried out substantially as follows:

A hot (85 to 90° C.) disodium orthophosphate solution, the composition of which has been adjusted by means of an alkali metal salt such as sodium carbonate to yield a $Na_2O/P_2O_5$ ratio of substantially 3 moles of $Na_2O$ per mole of $P_2O_5$, is mixed with a cold dilute ferric chloride solution (10% iron content by weight) in the proportion of approximately 2 moles of ferric iron per mole of $P_2O_5$. The mixing is carried out with efficient agitation and after the mixing is completed, the agitation is continued for a short period of time to cause the particles to agglomerate somewhat, whereupon the precipitate is filtered from the solution. The precipitate is washed on the filter until it is substantially free of chlorides; for most efficient washing, it is desirable, however, not to carry the washing beyond the point where the chlorides are reduced substantially below 0.5 of a per cent in the final product. It is also important not to wash beyond the point where the precipitate becomes gelatinous, otherwise difficulties in filtration are encountered. After the precipitate has been washed as described above, it is dried by heating to a temperature of 110–120° C. until substantially all of the free moisture has been removed. The product now consists of the compound $FePO_4 \cdot xH_2O$, a substantially white powder which on analysis contains less than 1% $Na_2O$. The value of $x$ may vary from 2 to 6 or a higher number, depending upon the extent of drying.

In the precipitation step, it is desirable that the proportions of dibasic alkali metal phosphate and alkali metal carbonate or bicarbonate which are mixed with the ferric salt solution be adjusted so that the final slurry has a pH substantially within the range of about 0.9 to about 4.0. If a pH of less than 0.9 is obtained, the yields of salt will be low. On the other hand, if the pH at the termination of the precipitation be above 4.0, the product will be dark colored. For the most satisfactory results, the pH of the final slurry should fall within the range of 1.2 to 1.6.

The invention is illustrated by the following specific examples.

*Example 1*

126.1 pounds of ferric chloride hexahydrate were dissolved in 140 to 150 pounds of water, and 90.6 pounds of $Na_2HPO_4 \cdot 2H_2O$, containing 39% $P_2O_5$ by weight and 27.3 pounds of soda ash containing 58% $Na_2O$ by weight were dissolved in 700–800 pounds of water heated to about 75–95° C. The two solutions were then gradually mixed together with vigorous agitation to uniformly disperse the precipitate and to prevent the formation of dark colored flocs of basic iron phosphates. The agitation was continued after completing the mixing to insure complete reaction and to agglomerate the particles somewhat to facilitate filtering. The product was filtered from the solution, washed until it was substantially free of chlorides and dried at a temperature of 110–120° C. The product consisted of powdered $FePO_4 \cdot 4H_2O$, having a creamy white color and a bulk density of about 0.3 gram per c. c. On analysis it was found to contain about 1% $Na_2O$.

In the above example the reactants were mixed in proportions giving a $Na_2O/P_2O_5$ ratio of substantially 3 and a $Fe_2O_3/P_2O_5$ ratio of 2.0. The pH of the final slurry was 1.1.

*Example 2*

80.6 pounds of soda ash were added to 700–800 pounds of water heated to a temperature of about 75–95° C. To the solution thus formed 65 pounds of 75% phosphoric acid were added with stirring and the carbon dioxide was allowed to boil out in a period of 30 to 60 minutes agitation.

To the above alkaline solution, a solution of 126.1 pounds of ferric chloride in 140 to 150 pounds of water was gradually added with vigorous agitation so that the precipitated ferric phosphate was uniformly dispersed and the formation of flocs of dark colored basic iron phosphates was avoided. Agitation was continued for a period of 15–30 minutes to insure complete reaction and to permit attainment of desired particle size before filtration. The product was recovered from the slurry by filtration, washed substantially free of chlorides and dried in an oven at a temperature of 105–125° C. The composition of the product was substantially as follows:

| | Per cent |
|---|---|
| $Fe_2O_3$ 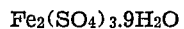 | 35.7 |
| $P_2O_5$ 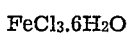 | 33.3 |
| Loss on ignition | 30.0 |
| (Water of crystallization and water of composition) | |
| Other substances such as $Na_2O$, Cl, etc. | 1.0 |
| | 100.0 |

*Example 3*

The procedure followed in Example 1 was repeated using approximately 131.5 pounds of $$Fe_2(SO_4)_3 \cdot 9H_2O$$

that is, that amount of ferric sulfate which is chemically equivalent to 126.1 pounds of $$FeCl_3 \cdot 6H_2O$$

In this case also a substantially white powdered ferric phosphate ($FePO_4 \cdot 4H_2O$) was produced.

*Example 4*

122.6 pounds of disodium phosphate dihydrate ($Na_2HPO_4 \cdot 2H_2O$) and 36.0 pounds of soda ash were dissolved in 1620 pounds of water heated to about 70–95° C.

To the above alkaline solution 140.2 pounds of ferric chloride dissolved in approximately 168 pounds of water were gradually added with vigorous agitation. The mixture was allowed to digest for about a half an hour at a temperature of 90° C. Then the slurry was filtered and the filter cake was washed with water, dried in an oven at a temperature of 110° C. and finely ground in an impact pulverizer. The product consisted of powdered $FePO_4 \cdot xH_2O$ which had a pale ochre color.

In this example the pH of the final slurry was about 4.0 and consequently the product had a relatively high sodium oxide content (7.78% $Na_2O$).

In each of the above examples a product was obtained which conformed to the color standards now required for iron compounds used in the production of "enriched" flour, bread, cereals and other food products.

In the practice of my process I prefer to carry out the reaction at a temperature below boiling and at a pH substantially in the range of 0.9 to about 4.0 as these conditions are essential to obtain a substantially white product. If, however, it is desirable to obtain a substantially white product having a low alkali metal oxide content, the reaction should be carried out at a pH substantially in the range of 0.9 to 2.0. By low alkali metal oxide content, I mean a product containing 1% or less of alkali metal oxide.

The reaction may be carried out at a boiling or a slightly higher temperature if a dark colored product is not objectionable.

It is to be understood that I do not intend to limit my invention to the above specific examples, but intend to include such modifications and changes and such equivalent materials as fall within the scope of the appended claims defining the invention.

What I claim is:

1. A process for making substantially white ferric orthophosphate which comprises dissolving 126.1 pounds of ferric chloride hexahydrate in 140 to 150 pounds of water, adding the resulting solution to a solution of 90.6 pounds of disodium phosphate dihydrate and 27.3 pounds of soda ash in 700 to 800 pounds of water, filtering the resulting slurry of precipitated ferric orthophosphate, washing and then drying the filter cake at a temperature of from 110 to 120° C.

2. A process for making substantially white ferric orthophosphate which comprises dissolving 131.5 pounds of ferric sulfate nonohydrate in 140 to 150 pounds of water, adding the resulting solution to a solution of 90.6 pounds of disodium phosphate dihydrate and 27.3 pounds of soda ash in 700 to 800 pounds of water, filtering the resulting slurry of precipitated ferric orthophosphate, washing and then drying the filter cake at a temperature of from 110 to 120° C.

3. A process for making substantially white ferric orthophosphate which comprises dissolving 80.6 pounds of soda ash in 700 to 800 pounds of water heated to about 75–95° C., adding 65 pounds of 75% phosphoric acid thereto with stirring, boiling the resulting solution to expel the liberated carbon dioxide and thereupon adding a solution of 126.1 pounds of ferric chloride in 140 to 150 pounds of water to the boiled solution to produce a slurry of precipitated ferric orthophosphate, agitating said slurry for 15 to 30 minutes, filtering the slurry, washing the filter cake until it is substantitally free of chloride and then drying the washed product at a temperature of from 105 to 125° C.

4. A process for making ferric orthophosphate which comprises dissolving a dibasic alkali metal phosphate and an alkali metal salt of carbonic acid in water to form a solution containing not more than 10% by weight of $P_2O_5$ and a composition having an alkali metal oxide/$P_2O_5$ ratio of substantially 3 to 1 and then adding to this solution an aqueous solution of a ferric salt selected from the group consisting of ferric chloride, ferric sulfate and ferric nitrate until the pH of the resulting slurry falls within the range of from 0.9 to 4.0, said ferric salt solution containing not over 17.8% by weight of iron.

5. A process for making ferric orthophosphate which comprises dissolving disodium orthophosphate and sodium carbonate in water to form a solution containing not more than 10% by weight of $P_2O_5$ and a composition having a $Na_2O/P_2O_5$ ratio of substantially 3 to 1 and then adding to this solution an aqueous solution of a ferric salt selected from the group consisting of ferric chloride, ferric sulfate and ferric nitrate until the pH of the resulting slurry falls within the range of from 0.9 to 2, said ferric salt solution containing about 10% by weight of iron.

6. A process for making ferric orthophosphate which comprises dissolving a dibasic alkali metal orthophosphate and an alkali metal salt of carbonic acid in water to form a solution containing from 3% to 5% by weight of $P_2O_5$ and a composition having an alkali metal oxide/$P_2O_5$ ratio of substantially 3 to 1 and then adding this solution to an aqueous solution of a ferric salt selected from the group consisting of ferric chloride, ferric sulfate and ferric nitrate until the pH of the resulting slurry falls within the range of from 1.2 to 1.6, said ferric salt solution containing not over 17.8% by weight of iron.

7. A process for making ferric orthophosphate which comprises dissolving disodium orthophosphate and sodium carbonate in water to form a solution containing from 3% to 5% by weight of $P_2O_5$ and a composition having a $Na_2O/P_2O_5$ ratio of substantially 3 to 1 and then adding this solution to an aqeuous solution of a ferric salt selected from the group consisting of ferric chloride, ferric sulfate and ferric nitrate until the pH of the resulting slurry falls within the range of from 1.2 to 1.6, said ferric salt solution containing not over 17.8% by weight of iron.

8. A process for making ferric orthophosphate which comprises dissolving a dibasic alkali metal orthophosphate and an alkali metal salt of carbonic acid in water to form a solution containing not more than 10% by weight of $P_2O_5$ and a composition having an alkali metal oxide/$P_2O_5$ ratio of substantially 3 to 1 and then adding this solution to an aqueous solution of a ferric salt selected from the group consisting of ferric chloride, ferric sulfate and ferric nitrate until the pH of the resulting slurry falls within the range of from 1.2 to 1.6, said ferric salt solution containing approximately 10% by weight of iron.

9. A process for making ferric orthophosphate which comprises dissolving disodium orthophosphate in water to form a solution containing 3% to 5% by weight of $P_2O_5$, adjusting the composition of said solution by adding sodium carbonate to obtain a $Na_2O/P_2O_5$ ratio of approximately 3 to 1 and then adding this solution to an aqueous solution of a ferric salt selected from the group consisting of ferric chloride, ferric sulfate, and ferric nitrate until the ratio of the ferric iron to the $P_2O_5$ content of the solution is substantially 2 to 1, said ferric salt containing not more than 17.8% by weight of iron.

10. A process for making ferric orthophosphate which comprises dissolving disodium orthophosphate in water to form a solution containing not more than 10% by weight of $P_2O_5$, adding a sufficient amount of sodium carbonate to said solution to theoretically produce trisodium phosphate and then adding the resulting aqueous solution to an aqueous solution of a ferric salt selected from the group consisting of ferric chloride, ferric sulfate and ferric nitrate until the ratio of the ferric iron to the $P_2O_5$ content of the solution is substantially 2 to 1, said ferric salt solution containing not more than 17.8% by weight of iron.

11. A process for making ferric orthophosphate which comprises dissolving in water a ferric salt selected from the group consisting of ferric chloride, ferric sulfate, and ferric nitrate to form a solution containing not more than 17.8% by weight of iron and then adding the resulting solution to a solution of disodium orthophosphate containing not over 10% by weight of $P_2O_5$ until the pH of the resulting slurry falls within the range of 1.2 to 1.6, said orthophosphate solution having added thereto a sufficient amount of an alkali metal salt of carbonic acid to yield a composition having a $Na_2O/P_2O_5$ ratio of approximately 3 to 1.

12. A process according to claim 11 in which the aqueous solution of disodium orthophosphate containing 3% to 5% by weight of $P_2O_5$.

13. A process according to claim 11 in which ferric sulfate is the ferric salt employed.

14. A process according to claim 11 in which ferric chloride is the ferric salt employed.

15. A process for making ferric orthophosphate which comprises adding with agitation an aqueous solution of a ferric salt selected from the group consisting of ferric chloride, ferric sulfate and ferric nitrate to a solution containing disodium phosphate and an alkali metal salt of carbonic acid until the pH of the resulting slurry falls within the range of from 1.2 to 1.6, continuing the agitation for a short period of time, filtering the slurry, washing and drying the precipitate, said phosphate solution containing not more than 10% by weight of $P_2O_5$, and said ferric salt solution containing about 10% by weight of iron.

16. A process for making ferric orthophosphate which comprises adding an aqueous solution of a ferric salt selected from the group consisting of ferric chloride, ferric sulfate and ferric nitrate to an aqueous solution containing disodium orthophosphate and sodium carbonate until the pH of the resulting slurry of ferric orthophosphate falls within the range of from 1.2 to 1.6, filtering, washing and drying said ferric orthophosphate, said phosphate solution containing not more than 10% by weight of $P_2O_5$, and said ferric salt solution containing about 10% by weight of iron.

MORRIS L. NIELSEN.